United States Patent
Rajput et al.

(10) Patent No.: US 12,506,728 B2
(45) Date of Patent: Dec. 23, 2025

(54) METHODS, SYSTEMS, AND COMPUTER READABLE MEDIA FOR USING SERVICE COMMUNICATION PROXY (SCP) TO OFFLOAD VERIFICATION OF CONSUMER NETWORK FUNCTION (NF) SECURITY CERTIFICATES

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 92 days.

(21) Appl. No.: 18/741,748

(22) Filed: Jun. 12, 2024

(65) Prior Publication Data

US 2025/0385898 A1    Dec. 18, 2025

(51) Int. Cl.
*H04L 9/32* (2006.01)
*H04L 9/40* (2022.01)

(52) U.S. Cl.
CPC ........ *H04L 63/0823* (2013.01); *H04L 9/3213* (2013.01); *H04L 9/3268* (2013.01)

(58) Field of Classification Search
CPC .. H04L 63/0823; H04L 9/3213; H04L 9/3268
USPC ........................................................ 713/156
See application file for complete search history.

(56) References Cited

U.S. PATENT DOCUMENTS

| | | | |
|---|---|---|---|
| 2021/0176237 A1* | 6/2021 | Nishida | H04L 63/0853 |
| 2021/0250172 A1* | 8/2021 | Choyi | H04L 9/3239 |
| 2021/0297942 A1* | 9/2021 | S Bykampadi | H04W 12/61 |
| 2022/0191028 A1* | 6/2022 | Aggarwal | H04L 63/0807 |
| 2022/0338104 A1* | 10/2022 | Son | H04W 12/06 |
| 2022/0360447 A1* | 11/2022 | Rajput | H04L 9/3247 |

(Continued)

FOREIGN PATENT DOCUMENTS

WO    WO-2021099675 A1 *  5/2021 ............. H04L 67/59

OTHER PUBLICATIONS

Jones, "JSON Web Signature (JWS)" Internet Engineering Task Force (IETF) Request for Comments (RFC) 7515, pp. 1-59 (May 2015).

(Continued)

*Primary Examiner* — Thanh T Le
(74) *Attorney, Agent, or Firm* — Jenkins, Taylor & Hunt, P.A.

(57) ABSTRACT

A method for offloading verification of consumer NF security certificates includes receiving, by an SCP, an SBI request message including a consumer NF security token signed by a consumer NF for authenticating the consumer NF to a producer NF. The method further includes obtaining, by the SCP and from the consumer NF security token, an identifier for a consumer NF security certificate or a copy of the consumer NF security certificate. The method further includes verifying, by the SCP and on behalf of the producer NF, the consumer NF security certificate. The method further includes performing, by the SCP and based on a verification result of the consumer NF security certificate, a network security action.

20 Claims, 7 Drawing Sheets

(56) References Cited

U.S. PATENT DOCUMENTS

| | | | | |
|---|---|---|---|---|
| 2023/0155832 | A1* | 5/2023 | Aggarwal | H04L 9/3263 726/5 |
| 2023/0262459 | A1* | 8/2023 | Li | H04L 67/303 455/410 |
| 2023/0283470 | A1* | 9/2023 | Rodrigo | H04L 63/0807 713/172 |
| 2023/0396602 | A1* | 12/2023 | Wu | H04L 9/3213 |
| 2024/0107299 | A1* | 3/2024 | Wang | H04L 67/562 |
| 2024/0236080 | A1* | 7/2024 | Kuravangi-Thammaiah | H04L 63/0884 |
| 2024/0381224 | A1* | 11/2024 | Landais | H04W 48/02 |
| 2025/0227104 | A1* | 7/2025 | Kuravangi-Thammaiah | H04L 63/083 |

OTHER PUBLICATIONS

"Housley, Internet X.509 Public Key Infrastructure Operational Protocols: FTP and HTTP", Internet Engineering Task Force (IETF) Request for Comments (RFC) 2585, pp. 1-8 (May 1999).

"Online Certificate Status Protocol", Wikipedia, pp. 1-6 (Sep. 2004).

"OCSP stapling", Wikipedia, pp. 1-4 (Dec. 2007).

Rescoria, "The Transport Layer Security (TLS) Protocol Version 1.3", Internet Engineering Task Force (IETF) Request for Comments (RFC) 8446, pp. 1-160 (Aug. 2018).

Santesson, et al., "X.509 Internet Public Key Infrastructure Online Certificate Status Protocol—OCSP", Internet Engineering Task Force (IETF) Request for Comments (RFC) 6960, pp. 1-41 (Jun. 2013).

Huawei, "Transport Layer Security (TLS) Extensions: Extension Definitions", Internet Engineering Task Force (IETF) Request for Comments (RFC) 6066, pp. 1-25 (Jan. 2011).

"3rd Generation Partnership Project; Technical Specification Group Core Network and Terminals; 5G System; Network Function Repository Services; Stage 3 (Release 18)" 3GPP TS 29.510 V18.6.0, pp. 1-412 (Mar. 2024).

"3rd Generation Partnership Project; Technical Specification Group Services and System Aspects; Security architecture and procedures for 5G system (Release 18)" 3GPP TS 33.501, V18.5.0, pp. 1-330 (Mar. 2024).

"3rd Generation Partnership Project; Technical Specification Group Core Network and Terminals; 5G System; Technical Realization of Service Based Architecture; Stage 3 (Release 18)" 3GPP TS 29.500, V18.5.0, pp. 1-150 (Mar. 2024).

* cited by examiner

METHODS, SYSTEMS, AND COMPUTER READABLE MEDIA FOR USING SERVICE COMMUNICATION PROXY (SCP) TO OFFLOAD VERIFICATION OF CONSUMER NETWORK FUNCTION (NF) SECURITY CERTIFICATES

TECHNICAL FIELD

The subject matter described herein relates to network security. More particularly, the subject matter described herein relates to methods, systems and computer readable media for using the SCP to offload verification of consumer NF security certificates.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFS connect to the SCP, and the SCP load balances traffic among producer NF service instances that provide the required services or directly routes the traffic to the destination producer NF instances.

One problem that can occur in 5G and subsequent generation networks is excessive network traffic and wasting of consumer NF and certificate authority (CA) processing and memory resources associated with verification of consumer NF security certificates. Consumer NFs authenticate themselves to producer NFs using security tokens signed by the consumer NFs. One example of security tokens used by consumer NFs to authenticate themselves are client credentials assertion (CCA) tokens. The procedure for a consumer NF to authenticate itself to a producer NF using a CCA token is described in 3GPP TS 33.501. Briefly, this procedure involves a consumer NF presenting a signed CCA token to a producer NF or an NRF in a service-based interface (SBI) request message. The producer NF or NRF, upon receiving the SBI request message, reads the CCA token, validates the JavaScript object notation (JSON) web signature (JWS) in the token using the procedure described in IETF RFC 7515, validates the timestamp and expiration time in the token, determines that the audience specified in the token matches its own type, and verifies that the NF instance ID in the CCA token matches the NF instance ID in the public key certificate included in or identified in the token.

The public key certificate included in or identified in the CCA token is an X.509 certificate. The CCA token will either include an X.509 uniform resource locator (URL), referred to as the x5u, for the certificate or an X.509 certificate chain, referred to as the x5c, which includes the X.509 certificate of the consumer NF. The authentication procedure in the preceding paragraph uses the X.509 certificate to validate the CCA token. However, the procedure does not check whether the X.509 certificate is invalid or has been revoked, i.e., because the certificate has been stolen and is being used by a hacker to impersonate the consumer NF. To check whether the X.509 certificate is invalid or has been revoked, the consumer NF sends the X.509 certificate or certificate URL to a certificate authority, the certificate authority performs a revocation check, and the certificate authority sends results of the revocation check to the producer NF. If the result of the revocation check is that the certificate is valid, the producer NF processes the SBI request. If the result of the revocation check is that the certificate is invalid, the producer NF rejects the request.

Consumer NFs present CCA tokens to producer NFs in SBI request messages transmitted to producer NFs. Requiring producer NFs to perform X.509 certificate revocation checks for every SBI request message including a CCA token received from a consumer NF causes excessive signaling in the network and burdens the processing and memory resources of producer NFs and the CA. For example, producer NFs may perform security certificate revocation checks for each SBI request received by the producer NFs, even though some of the requests may contain the same security token. Such overlapping verifications of security certificates unnecessarily burden the network.

Accordingly, in light of these and other difficulties, there exists a need for improved methods, systems, and computer readable media for verification of consumer NF security certificates.

SUMMARY

A method for offloading verification of consumer NF security certificates includes receiving, by an SCP, an SBI request message including a consumer NF security token signed by a consumer NF for authenticating the consumer NF to a producer NF. The method further includes obtaining, by the SCP and from the consumer NF security token, an identifier for a consumer NF security certificate or a copy of the consumer NF security certificate. The method further includes verifying, by the SCP and on behalf of the producer NF, the consumer NF security certificate. The method further includes performing, by the SCP and based on a verification result of the consumer NF security certificate, a network security action.

According to another aspect of the subject matter described herein, receiving an SBI request message including a consumer NF security token includes receiving an SBI request message including a client credentials assertion (CCA) token.

According to another aspect of the subject matter described herein, obtaining the identifier of the consumer NF security certificate or the copy of the consumer NF security certificate includes obtaining an identifier or a copy of an X.509 certificate from the consumer NF security token.

According to another aspect of the subject matter described herein, verifying the consumer NF security certificate includes determining, by the SCP, whether the SCP has a valid cached verification result for the consumer NF security certificate.

According to another aspect of the subject matter described herein, when the SCP has a valid cached verification result for the consumer NF security certificate, performing the network security action includes performing the network security action based on the cached verification result.

According to another aspect of the subject matter described herein, when the SCP does not have a valid cached verification result for the consumer NF security certificate, verifying the consumer NF security certificate includes transmitting, by the SCP and on behalf of the producer NF, an online certificate status protocol (OCSP) request message to a certificate authority, receiving, by the SCP and from the CA, an OCSP response message including the verification result and the method of offloading consumer NF security certificates further comprises caching, by the SCP, the verification result.

According to another aspect of the subject matter described herein performing the network security action includes appending the verification result to the SBI request message and transmitting the SBI request message to the producer NF.

According to another aspect of the subject matter described herein, when the SCP does not have a valid cached verification result for the consumer NF security certificate, verifying the consumer NF security certificate includes checking, by the SCP and on behalf of the producer NF, a certificate revocation list (CRL) and determining the verification result from the CRL.

According to another aspect of the subject matter described herein, the verification result indicates that the consumer NF security certificate has expired or has been revoked and performing the network security action includes rejecting the SBI request message.

According to another aspect of the subject matter described herein, rejecting the SBI request message includes dropping the SBI request message and/or generating a fake response to the SBI request message.

According to another aspect of the subject matter described herein, a system for offloading verification of consumer network function (NF) security certificates is provided. The system includes an SCP including at least one processor and a memory. The system further includes a consumer NF security certificate verification offload manager for receiving a service-based interface (SBI) request message including a consumer NF security token signed by a consumer NF for authenticating the consumer NF to a producer NF, obtaining, from the consumer NF security token, an identifier for a consumer NF security certificate or a copy of the consumer NF security certificate, verifying, on behalf of the producer NF, the consumer NF security certificate, and performing, based on a verification result of the consumer NF security certificate, a network security action.

According to another aspect of the subject matter described herein, the consumer NF security token comprises a CCA token.

According to another aspect of the subject matter described herein, the identifier of the consumer NF security certificate or the copy of the consumer NF security certificate comprises an identifier or a copy of an X.509 certificate.

According to another aspect of the subject matter described herein, in verifying the consumer NF security certificate, the consumer NF security certificate verification offload manager is configured to determine whether the SCP has a valid cached verification result for the consumer NF security certificate.

According to another aspect of the subject matter described herein, when the SCP has a valid cached verification result for the consumer NF security certificate, the consumer NF security certificate verification offload manager is configured to perform the network security action based on the cached verification result.

According to another aspect of the subject matter described herein, when the SCP does not have a valid cached verification result for the consumer NF security certificate, the consumer NF security certificate verification offload manager is configured to verify the consumer NF security certificate by transmitting, by the SCP and on behalf of the producer NF, an OSCP request message to a CA and receiving, by the SCP and from the CA, an OCSP response message including the verification result and wherein the consumer NF security certificate verification offload manager is further configured to cache the verification result.

According to another aspect of the subject matter described herein, the consumer NF security certificate verification offload manager is configured to perform the network security action by appending the verification result to the SBI request message and transmitting the SBI request message to the producer NF.

According to another aspect of the subject matter described herein, when the SCP does not have a valid cached verification result for the consumer NF security certificate, the consumer NF security certificate verification offload manager is configured to verify the consumer NF security certificate by checking, on behalf of the producer NF, a certificate revocation list (CRL) and determining the verification result from the CRL.

According to another aspect of the subject matter described herein, the verification result indicates that the consumer NF security certificate has been revoked and to perform the network security action by rejecting the SBI request message including dropping the SBI request message and/or generating a fake response to the SBI request message.

According to another aspect of the subject matter described herein, a non-transitory computer readable medium having stored thereon executable instructions that when executed by a processor of a computer control the computer to perform steps is provided. The steps include receiving, an SCP, an SBI request message including a consumer NF security token signed by a consumer NF for authenticating the consumer NF to a producer NF. The steps further include obtaining, by the SCP and from the consumer NF security token, an identifier for a consumer NF security certificate or a copy of the consumer NF security certificate. The steps further include verifying, by the SCP and on behalf of the producer NF, the consumer NF security certificate. The steps further include performing, by the SCP and based on a verification result of the consumer NF security certificate, a network security action.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
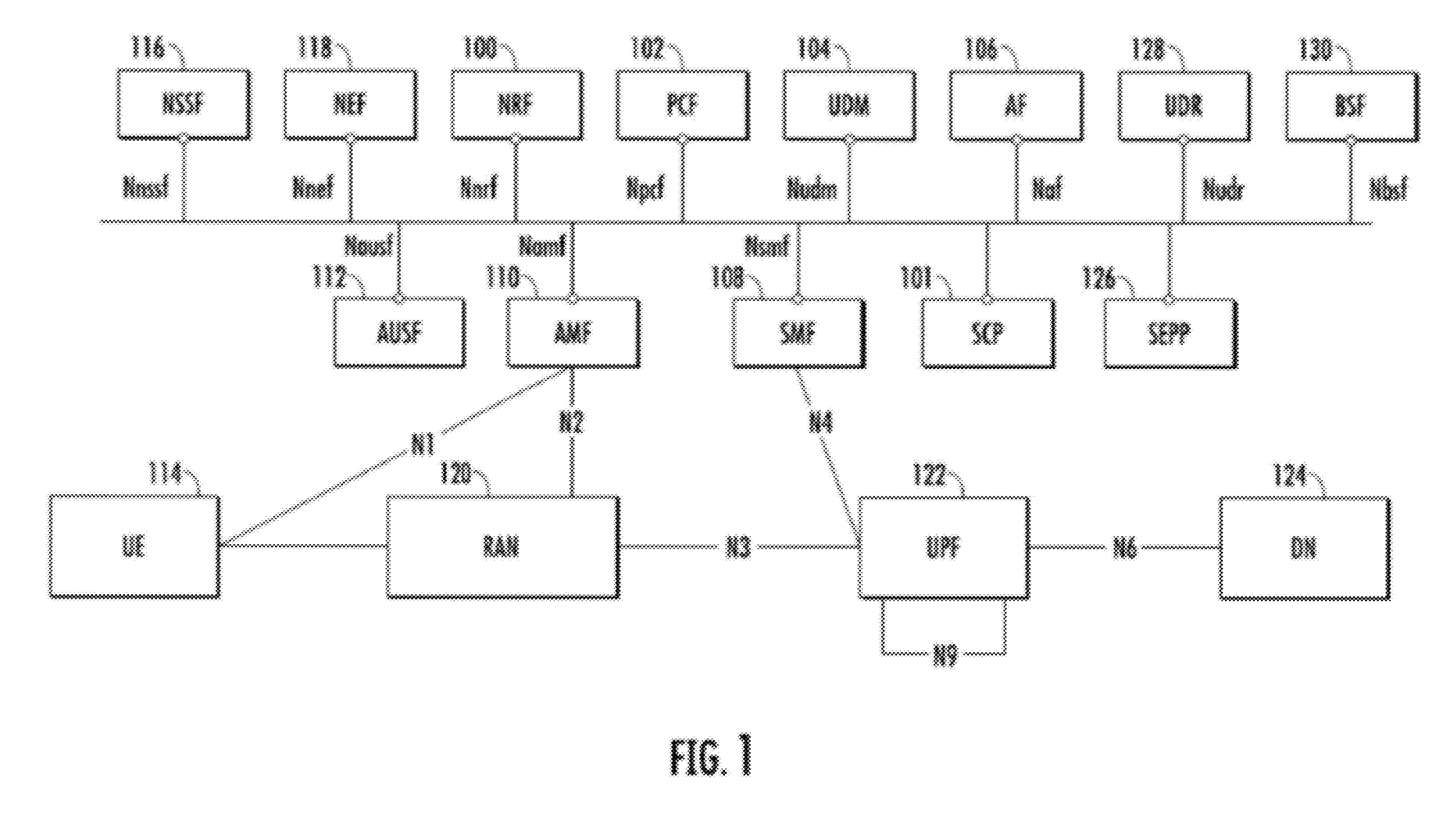
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one problem that can occur in 5G and subsequent generation networks is excessive network traffic and wasting of consumer NF and CA resources associated with verification of consumer NF security certificates. A CCA token is signed by the consumer NF, and the CCA token needs to be verified by the NF service producer or NRF. Part of the needed verification is to check the whether the X.509 certificate has been revoked. To perform this verification, the producer NF contacts the CA using the OCSP or uses another method, such as a certificate revocation list (CRL).

The subject matter described herein offloads the X.509 certificate verification process from the producer NF or NRF to the SCP. The SCP can verify the X.509 public key certificate and, when the verification fails, the SCP can reject the SBI request messages by either dropping the SBI request messages and optionally providing fake SBI response messages to the NF service consumers. In another example, the SCP can add/staple to the SBI request message all or a portion of the OCSP response message received from the CA. The SCP then forwards the SBI request message to the NF service producer. The NF service producer can then utilize the already obtained verification result for the X.509 certificate to determine whether to process or reject the SBI request message. By offloading the X.509 certificate verification functionality from the NF service producer to the SCP, a significant cost in terms of CPU/RAM/bandwidth resources is saved on both the NF service producer and the CA. Further, the latency in processing SBI request messages is also improved, as the NF service producer is not required to interact with the CA using OCSP or to fetch the X.509 certificate specified by the x5u. Some cost is incurred at the SCP, but the cost incurred is only once per NF service consumer, rather than once per combination of NF service consumer and NF service producer.

The CCA is a JWS token defined by 3GPP TS 33.501 section 13.3.8. The CCA token is sent in the header '3gpp-Sbi-Client-Credentials' as described in the following passage from 3GPP TS 29.500 section 5.2.3.2.11.

The Client credentials assertion (CCA) is a token signed by the NF Service Consumer. It enables the NF Service Consumer to authenticate towards the receiving end point (NRF, NF Service Producer) by including the signed token in a service request.

CCA claims encoded as JSON objects as defined in Tables 1 below, which is illustrated in 3GPP TS 29.500, section 5.2.3.2.11.

TABLE 1

CCA Claims

| Attribute Name | Data Type | Description |
| --- | --- | --- |
| Sub | NfInstanceID | NF instance ID of the NF service consumer |
| iat | integer | Time at which JWT was issued |
| exp | integer | Expiration Time |
| aud | array(NFType) | NF type of the NF service producer and/or "NRF" |

In addition to the claims, one of the following JSON object signing and encryption (JOSE) headers is also needed to verify the X.509 certificate.

TABLE 2

JOSE Headers included in CCA Token

| Parameter | Description |
| --- | --- |
| x5u | URL for X.509 certificate used for signing |
| x5c | Actual X.509 certificate used for signing |

The X.509 certificate specified by the x5c or obtained from the x5u URL needs to be verified. One of the verifications is a certificate revocation check, which requires the NF service producer to contact the CA.

One way to perform the certificate revocation check is to use the certificate status request extension. The certificate status request extension defined in IETF RFC 6066 allows a transport layer security (TLS) endpoint to receive/send X.509 certificate status information as part of the TLS handshake. The extension allows the presenter of a certificate to bear the cost involved in providing OCSP responses. The extension is also referred to as OCSP stapling, as the OCSP responses are stapled/appended by the TLS endpoint to the TLS handshake. The motivation for doing this is to reduce the cost incurred in verification of the certificate by every TLS peer for a TLS endpoint.

Verification of the X.509 public key certificate used for the CCA token at the NF service producer requires each NF service producer to send OCSP requests to the CA, which results in significant resource utilization cost for both the NF service producer and the CA. Other mechanisms, such as using a certificate revocation list (CRL) to verify the X.509 certificate have a similar cost, although OCSP is used as the primary example herein.

Figure 2:
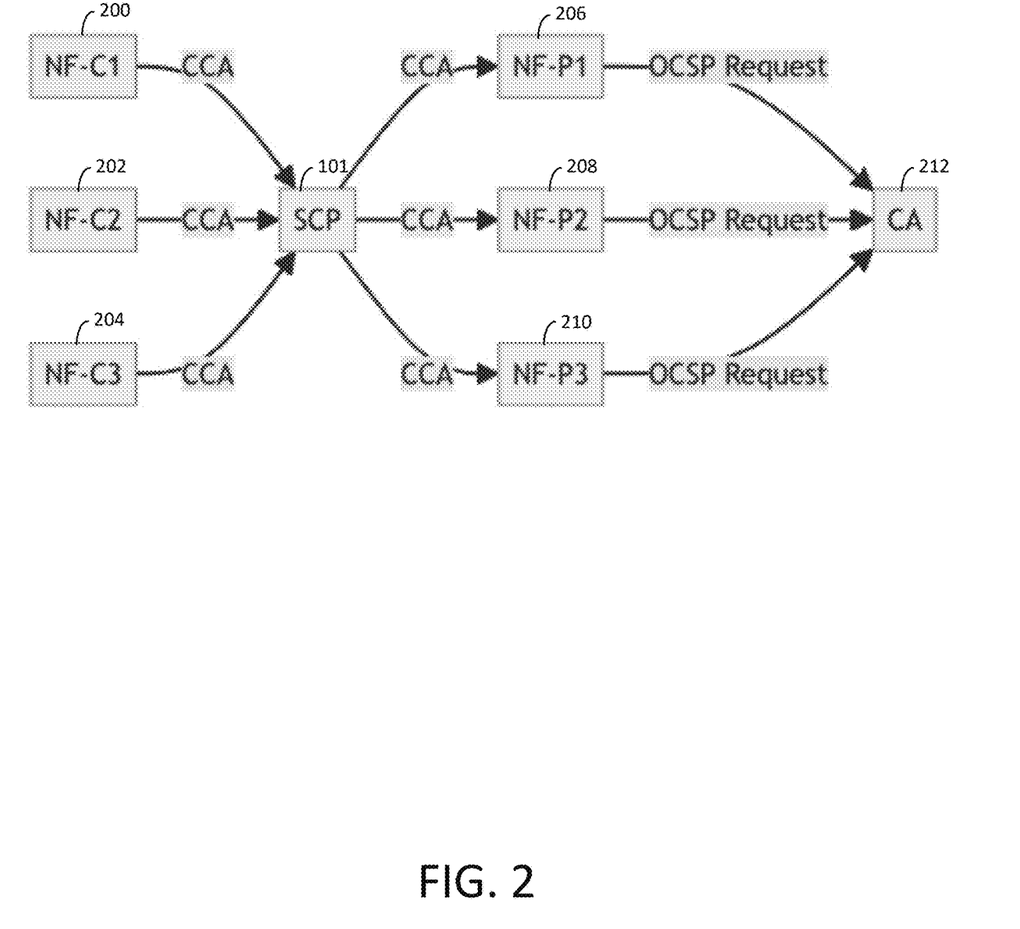
FIG. 2 is a network diagram illustrating producer NFs verifying consumer NF security certificates with a CA.

FIG. 2 is a network diagram illustrating producer NFs verifying consumer NF security certificates with a CA. In FIG. 2, each of a plurality of NF service consumers 200, 202, and 204 initiates SBI request messages towards NF service producers 206, 208, and 210. The SBI requests each include CCA tokens. The SBI requests are routed by SCP 101. In response to receiving each SBI request, NF service producers 206, 208, and 210 generates and sends an OCSP request to CA 212. CA 212 verifies the CCA token and sends CCA responses to NF service producers 206, 208, and 210. Assuming that the CCA tokens are successfully verified, NF service producers 206, 208, and 210 process the SBI requests and respond to NF service consumers 200, 202, and 204. Thus, using the verification model illustrated in FIG. 2, the number of OCSP requests is equal to the number of SBI requests with CCA tokens transmitted to the NF service producers, which can cause signaling and resource burdens on the network.

Figure 3:
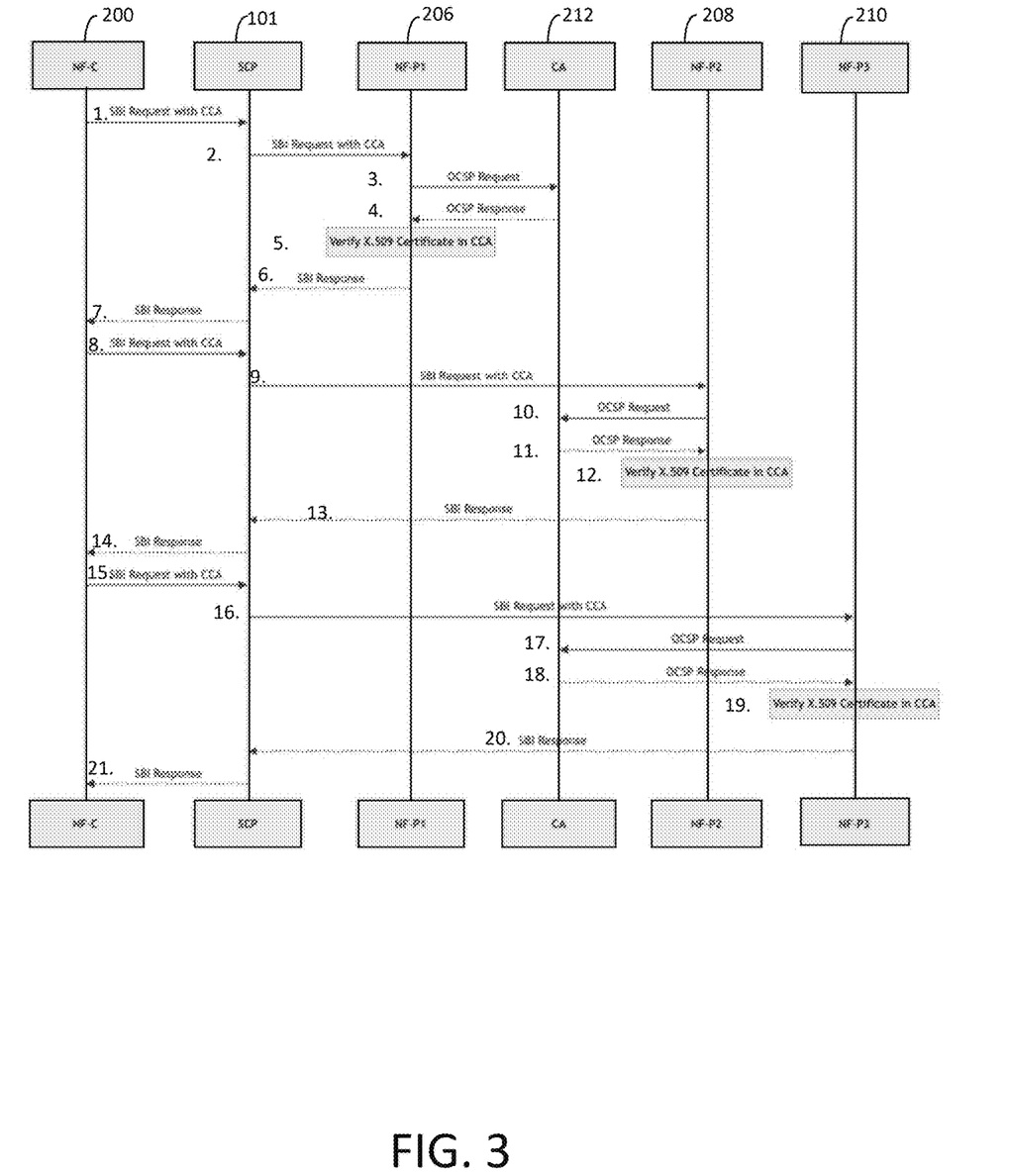
FIG. 3 is a message flow diagram illustrating exemplary messages associated with producer NFs verifying consumer NF security certificates with a CA.

FIG. 3 is a message flow diagram illustrating exemplary messages associated with producer NFs verifying consumer NF security certificates with a CA. FIG. 3 illustrates that, for a single CCA token generated by an NF service consumer, each NF service producer initiates an OCSP request towards the CA for the NF service consumer public key certificate used for the CCA token. Referring to the message flow illustrated in FIG. 3, in step 1, NF service consumer 200 transmits an SBI request with a CCA token to SCP 101. In step 2, SCP 101 routes the SBI request to NF service producer 206. In step 3, NF service producer 206 transmits an OCSP request to CA 212. CA 212 verifies the X.509 certificate and, in step 4, sends an OCSP response to NF service producer 206. In step 5, NF service producer 206 verifies the X.509 token based on the OCSP response and, in step 6, transmits an SBI response towards NF service consumer 200. In step 6, SCP 101 routes the SBI response to NF service consumer 200.

In step 8, NF service consumer 200 initiates a new SBI request to NF service producer 208. The SBI request in step 8 includes a CCA token including or identifying the same X.509 certificate used by NF service consumer 200 in step 1. In step 9, SCP 101 routes the SBI request to NF service producer 208. In step 10, NF service producer 208 transmits to CA 212 an OCSP request including or identifying the X.509 certificate. CA 212 performs a revocation check for the X.509 certificate and, in step 11, transmits an OCSP response, including results of the revocation check, to NF service producer 208. In step 12, NF service producer 208 verifies the X.509 certificate based on the revocation results received in the CCA response. In step 13, NF service producer 208 generates and transmits an SBI response towards NF service consumer 200. In step 14, SCP 101 routes the SBI response to NF service consumer 200.

In step 15, NF service consumer 200 initiates a new SBI request to NF service producer 210. The SBI request in step 15 includes a CCA token including or identifying the same X.509 certificate used by NF service consumer 200 in step 1 and step 8. In step 16, SCP 101 routes the SBI request to NF service producer 210. In step 17, NF service producer 210 transmits an OCSP request including or identifying the X.509 certificate to CA 212. CA 212 performs a revocation check for the X.509 certificate and, in step 18, transmits an OCSP response including results of the revocation check to NF service producer 210. In step 19, NF service producer 210 verifies the X.509 certificate based on the revocation results received in the CCA response. In step 20, NF service producer 210 generates and transmits an SBI response towards NF service consumer 200. In step 21, SCP 101 routes the SBI response to NF service consumer 200.

Thus, in FIG. 3, verification of the same X.509 certificate is requested from the CA three times, as illustrated by the OCSP requests in steps 3, 10, and 17. Such overlapping verification is unnecessary and wastes network resources.

Figure 4:
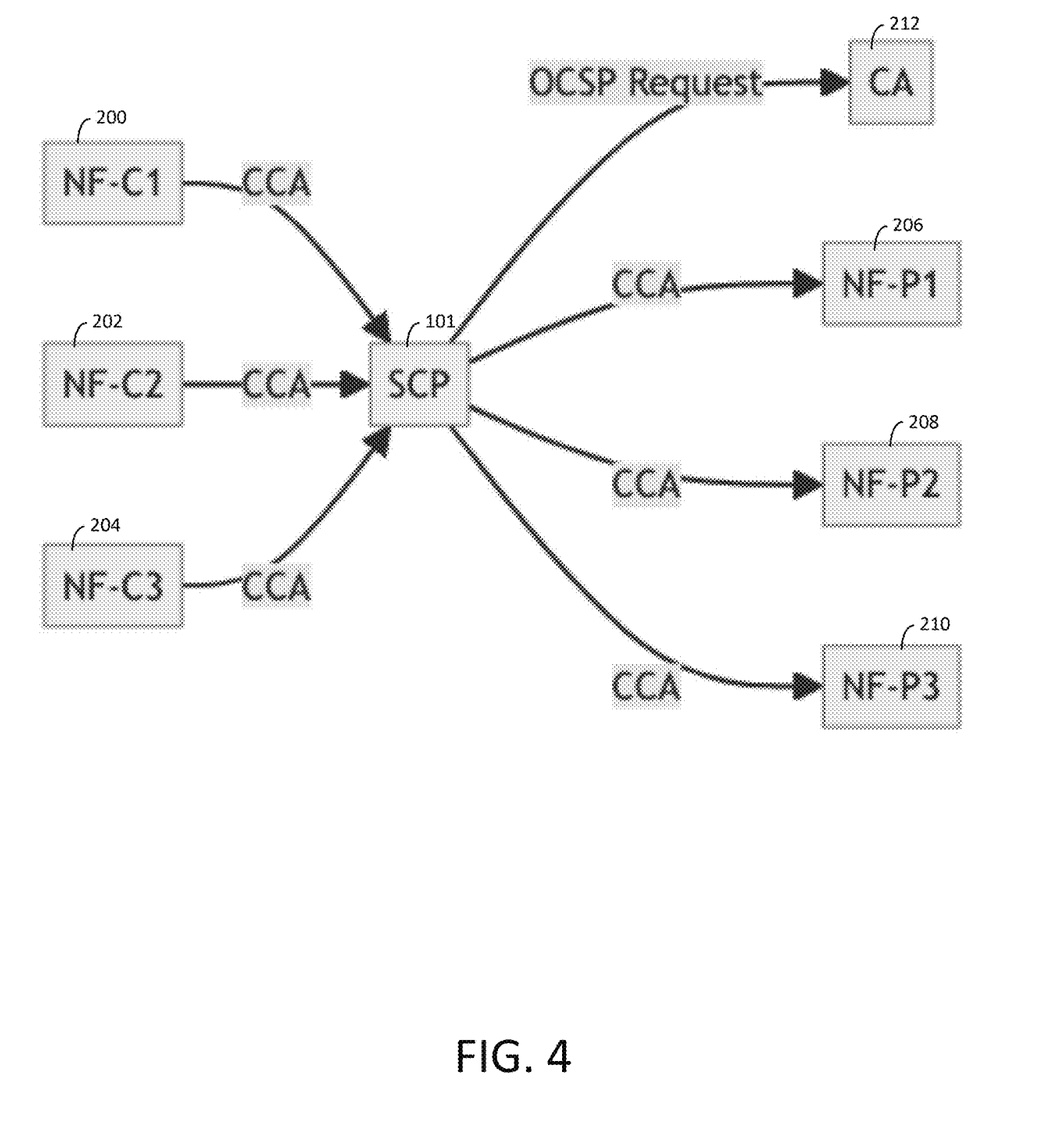
FIG. 4 is a network diagram illustrating an SCP offloading verification of consumer NF security certificates with a CA.

FIG. 4 is a network diagram illustrating an SCP offloading verification of consumer NF security certificates with a CA. Rather than having the NF service producers initiate the OSCP requests to the CA, in FIG. 4, SCP 101 initiates OCSP requests towards CA 212 on behalf of the NF service producers. The number of OCSP requests generated by SCP 101 is equal to the number of unique X.509 certificates received in different CCA tokens in the SBI requests. The scenario illustrated in FIG. 4 can be contrasted with the scenario illustrated in FIG. 2, in which the NF service producers are each required to initiate an OSCP request to the CA for each SBI request with a CCA token that is received.

Figure 5:
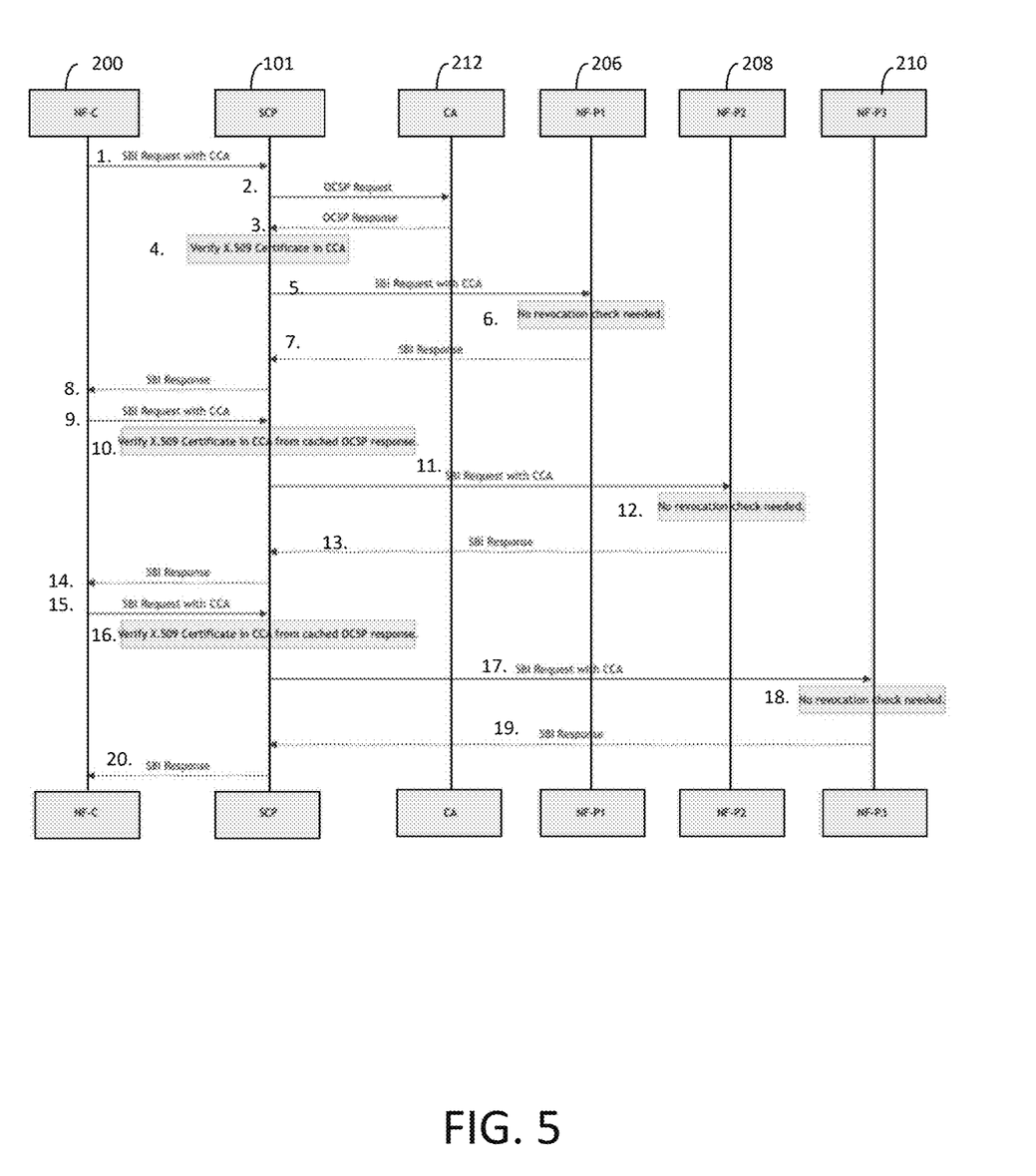
FIG. 5 is a message flow diagram illustrating exemplary messages exchanged when an SCP is used to offload verification of consumer NF security certificates.

FIG. 5 is a message flow diagram illustrating exemplary messages exchanged when an SCP is used to offload verification of consumer NF security certificates. In FIG. 5, only a single OCSP request from SCP 101 towards CA 212 is required for verifying three CCA tokens. Referring to the message flow illustrated in FIG. 5, in step 1, NF service consumer 200 transmits an SBI request with a CCA token to SCP 101. In step 2, SCP 101 transmits an OCSP request to CA 212. CA 212 verifies the X.509 certificate and, in step 3, sends an OCSP response to SCP 101. In step 4, SCP 101 verifies the X.509 certificate based on the OCSP response and caches results of the X.509 certificate verification obtained from CA 212. In step 5, SCP 101 appends results of the X.509 certificate verification to the SBI request and routes the SBI request to NF service producer 206. In step 6, NF service producer 206 reads the results of the X.509 certificate verification appended to the SBI request by SCP 101, determines that X.509 certificate verification is not required, and, in step 7, generates and sends an SBI response towards NF service consumer 200. In step 8, SCP 101 routes the SBI response to NF service consumer 200.

In step 9, NF service consumer 200 initiates a new SBI request to NF service producer 208. The SBI request in step 9 includes a CCA token including or identifying the same X.509 certificate used by NF service consumer 200 in step 1. In step 10, SCP 101 verifies the X.509 certificate using the verification results cached in step 4. Verifying the X.509 certificate may include determining whether the cached results are valid, i.e., unexpired, and whether the results indicate that the X.509 certificate has been revoked.

In step 11, SCP 101 appends results of the SBI revocation check to the SBI request and routes the SBI request to NF service producer 208. In step 12, NF service producer 208 determines that an X.509 certificate revocation check is not required because the SBI request includes results of the revocation check performed by SCP 101. In step 13, NF service producer 208 generates and transmits an SBI response towards NF service consumer 200. In step 14, SCP 101 routes the SBI response to NF service consumer 200.

In step 15, NF service consumer 200 initiates a new SBI request to NF service producer 210. The SBI request in step 15 includes a CCA token including or identifying the same X.509 certificate used by NF service consumer 200 in step 1 and step 9. In step 16, SCP 101 validates the X.509 certificate using the verification results cached in step 4. In step 17, SCP 101 appends results of the SBI revocation check to the SBI request and routes the SBI request to NF service producer 210. In step 18, NF service producer 210 determines that an X.509 certificate revocation check is not required because the SBI request includes results of the revocation check performed by SCP 101. In step 19, NF service producer 210 generates and transmits an SBI response towards NF service consumer 200. In step 20, SCP 101 routes the SBI response to NF service consumer 200.

Thus, in the example illustrated in FIG. 5, the SCP performs X.509 certificate verification on behalf of NF service producers. SCP 101 also caches and re-uses results of X.509 certificate verification. As a result, network traffic, resource utilization, and SBI response latency are all reduced.

Figure 6:
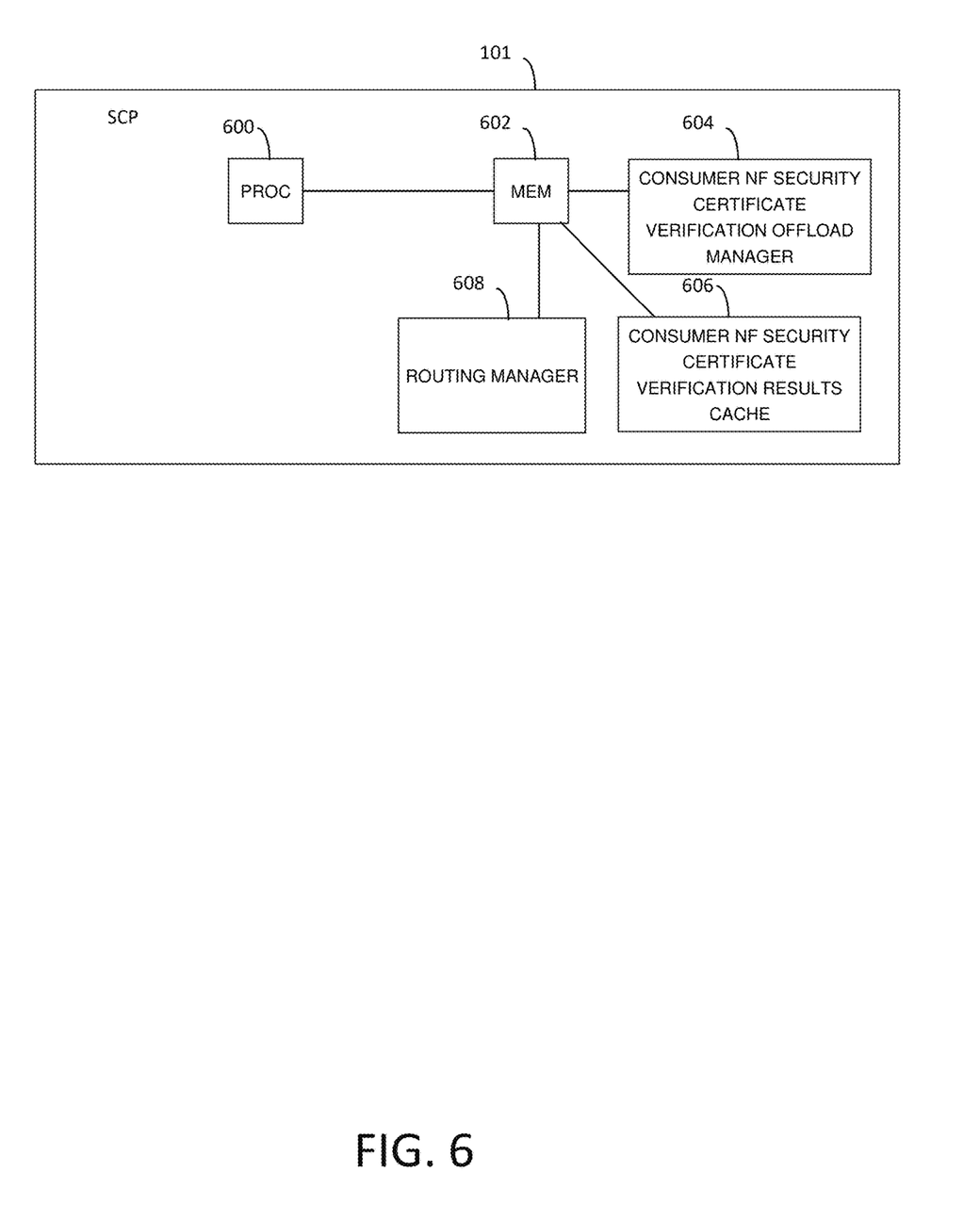
FIG. 6 is a block diagram illustrating an exemplary architecture of an SCP for offloading verification of consumer NF security certificates.

FIG. 6 is a block diagram illustrating an exemplary architecture of an SCP for offloading verification of consumer NF security certificates. Referring to FIG. 6, SCP 101 includes at least one processor 600 and memory 602. SCP 101 also includes a consumer NF security certificate verification offload manager 604 for performing the steps described herein for offloading verification of consumer NF security certificates, such as X.509 certificates, from producer NFs. SCP 101 also includes a consumer NF security certificate verification results cache 606 for caching results of consumer NF security certificate verification so that the results can be re-used by SCP 101. SCP 101 further includes a routing manager 608 for routing SBI request messages. Consumer NF security certificate verification offload manager 604 and routing manager 608 may be implemented using computer-executable instructions stored in memory 602 and executed by processor 600.

Figure 7:
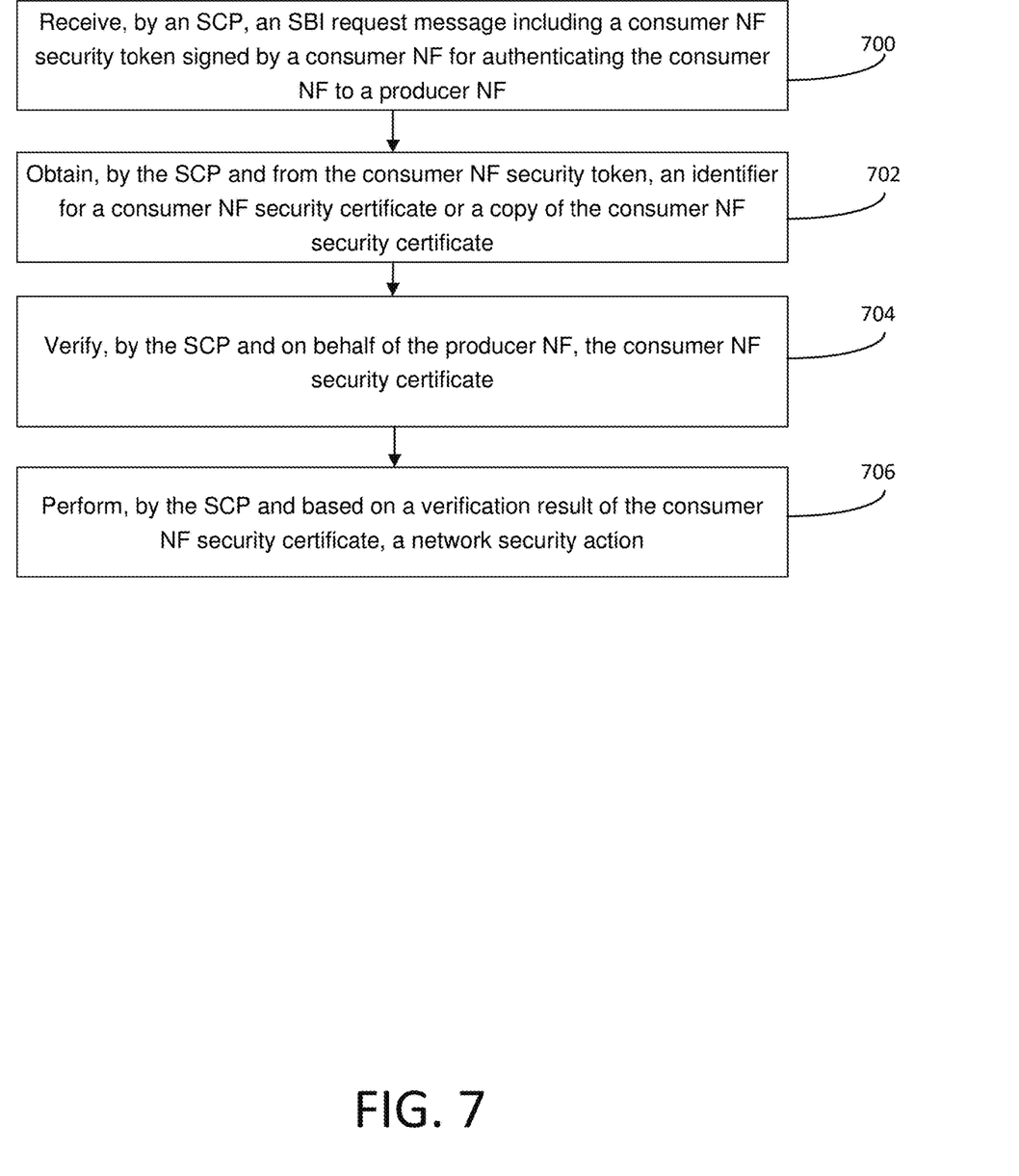
FIG. 7 is a flow chart illustrating an exemplary process for using an SCP for offloading verification of consumer NF security certificates.

FIG. 7 is a flow chart illustrating an exemplary process for using an SCP for offloading verification of consumer NF security certificates. Referring to FIG. 7, in step 700, the process includes receiving, by an SCP, an SBI request message including a consumer NF security token signed by a consumer NF for authenticating the consumer NF to a producer NF. For example, an SCP, such as SCP 101, may receive an SBI request message including a CCA token signed by the consumer NF.

In step 702, the process further includes obtaining, by the SCP and from the consumer NF security token, an identifier for a consumer NF security certificate or a copy of the consumer NF security certificate. For example, an SCP, such as SCP 101 may read the X.509 certificate from the x5c included with the CCA token. Alternatively, SCP 101 may read the x5u from the CCA token.

In step 704, the process further includes verifying, by the SCP and on behalf of the producer NF, the consumer NF security certificate. For example, an SCP, such as SCP 101, may transmit an OCSP request to CA 212, where the OCSP request includes the X.509 security certificate or the x5u. Alternatively, the SCP may send a message to CA 212 including the X.509 certificate or the x5u and requesting that CA 212 verify whether or not the X.509 certificate is in a CRL. If the CRL is maintained by CA 212, the SCP may request the CRL from CA 212 and determine whether the X.509 certificate is included in the CRL. If the CRL is maintained in a repository separate from the CRL, the SCP may query the repository to obtain the CRL and determine whether the X.509 certificate is in the CRL. If the X.509 certificate is in the CRL, the SCP may determine that the X.509 certificate has been revoked. If the X.509 certificate is not in the CRL, the SCP may determine that the X.509 certificate has not been revoked.

In step 706, the process further includes performing, by the SCP and based on a verification result of the consumer NF security certificate, a network security action. For example, an SCP, such as SCP 101, may, in response to receiving an indication from the CA that the X.509 certificate has not been revoked, append the X.509 verification result to the SBI request message and route the SBI request message to an NF service producer. If the SCP receives an indication that the X.509 certificate has been revoked, the SCP may perform an operator-configured action based on a mode. One mode is the reject mode, where the SCP prevents forwarding of the SBI request message to the NF service producer. Another mode is the forward mode where the SCP appends an indication of failure of verification of the X.509 certificate to the SBI request and forwards the SBI request message to the NF service producer.

As an example of resource savings that may be achieved by offloading X.509 certificate verification as described herein, assume that 100 NF service consumers are communicating with NF service producers and each NF service consumer sends 10 SBI requests with CCA tokens to the NF service producers. Without the solution described herein, the result is 100×10=1000 OCSP requests sent to the CA. With the solution described herein, only 100 (equal to the number of NF service consumers) OCSP requests would be initiated.

Exemplary advantages of the subject matter described herein include saving network resources (CPU/RAM/bandwidth) as the verification is performed once at the SCP per unique X.509 security certificate instead of once per SBI request message at the NF service producers. The solution described herein improves aggregate SBI message latency, as the verification is performed once at the SCP instead of once for each SBI request message. The subject matter described herein improves the security posture of the network by ensuring, by the SCP, that the X.509 certificate security check is performed for each unique X.509 certificate received by the SCP.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; Security architecture and procedures for 5G System (Release 18) 3GPP TS 33.501 V18.5.0 (2024-03)
3. 3$^{rd}$ Generation Partnership Project; Technical Specification Group Core Network and Terminals; 5G System; Technical Realization of Service Based Architecture; Stage 3 (Release 18) 3GPP TS 29.500 V18.5.0 (2024-03)
4. Eastlake 3$^{rd}$, D., Transport Layer Security (TLS) Extensions; Extension Definitions, IETF RFC 6066 (January 2011)
5. Santesson et al., X.509 Internet Public Key Infrastructure Online Certificate Status Protocol—OCSP, IETF RFC 6960 (June 2013)
6. Rescorla, E., Transport Layer Security (TLS) Protocol Version 1.3, IETF RFC 8446 (August 2018)
7. Housley, R. and Hoffman, P., Internet X.509 Public Key Infrastructure Operational Protocols: FTP and HTTP, IETF RFC 2585 (May 1999)
8. Jones, M. et al., JSON Web Signature (JWS), IETF RFC 7515 (May 2015)
9. OCSP Stapling, Wikipedia (May 17, 2024)
10. Online Security Status Protocol, Wikipedia (May 28, 2024)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for offloading verification of consumer network function (NF) security certificates, the method comprising:
   receiving, by a service communication proxy (SCP), a service-based interface (SBI) request message including a consumer NF security token signed by a consumer NF for authenticating the consumer NF to a producer NF;
   obtaining, by the SCP and from the consumer NF security token, an identifier for a consumer NF security certificate or a copy of the consumer NF security certificate;
   verifying, by the SCP and on behalf of the producer NF, the consumer NF security certificate; and
   performing, by the SCP and based on a verification result of the consumer NF security certificate, a network security action.

2. The method of claim 1 wherein receiving an SBI request message including a consumer NF security token includes receiving an SBI request message including a client credentials assertion (CCA) token.

3. The method of claim 1 wherein obtaining the identifier of the consumer NF security certificate or the copy of the consumer NF security certificate includes obtaining an identifier or a copy of an X.509 certificate from the consumer NF security token.

4. The method of claim 1 wherein verifying the consumer NF security certificate includes determining, by the SCP, whether the SCP has a valid cached verification result for the consumer NF security certificate.

5. The method of claim 4 wherein, when the SCP has a valid cached verification result for the consumer NF security certificate, performing the network security action includes performing the network security action based on the cached verification result.

6. The method of claim 4 wherein, when the SCP does not have a valid cached verification result for the consumer NF security certificate, verifying the consumer NF security certificate includes:
   transmitting, by the SCP and on behalf of the producer NF, an online certificate status protocol (OCSP) request message to a certificate authority (CA); and
   receiving, by the SCP and from the CA, an OCSP response message including the verification result and wherein the method further comprises caching, by the SCP, the verification result.

7. The method of claim 6 wherein performing the network security action includes appending the verification result to the SBI request message and transmitting the SBI request message to the producer NF.

8. The method of claim 4 wherein, when the SCP does not have a valid cached verification result for the consumer NF security certificate, verifying the consumer NF security certificate includes:
   checking, by the SCP and on behalf of the producer NF, a certificate revocation list (CRL); and
   determining the verification result from the CRL.

9. The method of claim 1 wherein the verification result indicates that the consumer NF security certificate has expired or has been revoked and performing the network security action includes rejecting the SBI request message.

10. The method of claim 9 wherein rejecting the SBI request message includes dropping the SBI request message and/or generating a fake response to the SBI request message.

11. A system for offloading verification of consumer network function (NF) security certificates, the system comprising:
   a service communication proxy (SCP) including at least one processor and a memory; and
   a consumer NF security certificate verification offload manager for receiving a service-based interface (SBI) request message including a consumer NF security token signed by a consumer NF for authenticating the consumer NF to a producer NF, obtaining, from the consumer NF security token, an identifier for a consumer NF security certificate or a copy of the consumer NF security certificate, verifying, on behalf of the producer NF, the consumer NF security certificate, and performing, based on a verification result of the consumer NF security certificate, a network security action.

12. The system of claim 11 wherein the consumer NF security token comprises a client credentials assertion (CCA) token.

13. The system of claim 11 wherein the identifier of the consumer NF security certificate or the copy of the consumer NF security certificate comprises an identifier or a copy of an X.509 certificate.

14. The system of claim 11 wherein, in verifying the consumer NF security certificate, the consumer NF security certificate verification offload manager is configured to determine whether the SCP has a valid cached verification result for the consumer NF security certificate.

15. The system of claim 14 wherein, when the SCP has a valid cached verification result for the consumer NF security certificate, the consumer NF security certificate verification offload manager is configured to perform the network security action based on the cached verification result.

16. The system of claim 14 wherein, when the SCP does not have a valid cached verification result for the consumer NF security certificate, the consumer NF security certificate verification offload manager is configured to verify the consumer NF security certificate by:
   transmitting, by the SCP and on behalf of the producer NF, an online certificate status protocol (OCSP) request message to a certificate authority (CA); and
   receiving, by the SCP and from the CA, an OCSP response message including the verification result and wherein the consumer NF security certificate verification offload manager is further configured to cache the verification result.

17. The system of claim 16 wherein the consumer NF security certificate verification offload manager is configured to perform the network security action by appending the verification result to the SBI request message and transmitting the SBI request message to the producer NF.

18. The system of claim 14 wherein, when the SCP does not have a valid cached verification result for the consumer NF security certificate, the consumer NF security certificate verification offload manager is configured to verify the consumer NF security certificate by:
   checking, on behalf of the producer NF, a certificate revocation list (CRL); and
   determining the verification result from the CRL.

19. The system of claim 11 wherein the verification result indicates that the consumer NF security certificate has been revoked and to perform the network security action by rejecting the SBI request message including dropping the SBI request message and/or generating a fake response to the SBI request message.

20. A non-transitory computer readable medium having stored thereon executable instructions that when executed by a processor of a computer control the computer to perform steps comprising:
   receiving, by a service communication proxy (SCP), a service-based interface (SBI) request message including a consumer NF security token signed by a consumer NF for authenticating the consumer NF to a producer NF;
   obtaining, by the SCP and from the consumer NF security token, an identifier for a consumer NF security certificate or a copy of the consumer NF security certificate;
   verifying, by the SCP and on behalf of the producer NF, the consumer NF security certificate; and
   performing, by the SCP and based on a verification result of the consumer NF security certificate, a network security action.

* * * * *